June 8, 1943. R. C. SABINS Re. 22,332

OIL BURNER CONSTRUCTION

Original Filed Feb. 15, 1939 2 Sheets-Sheet 1

INVENTOR.
Rolland C. Sabins
BY Wilkinson, Huxley, Byron & Knight
ATTORNEYS

June 8, 1943. R. C. SABINS Re. 22,332

OIL BURNER CONSTRUCTION

Original Filed Feb. 15, 1939 2 Sheets-Sheet 2

CONSTANT LEVEL CONTROL DEVICE

INVENTOR.
Rollard C. Sabins,
BY Wilkinson Huxley Byron & Knight
ATTORNEYS.

Reissued June 8, 1943

Re. 22,332

UNITED STATES PATENT OFFICE 22,332

OIL BURNER CONSTRUCTION

Rolland C. Sabins, Seattle, Wash., assignor to Oil Devices, Santa Fe, N. Mex., a limited partnership of Illinois Original No. 2,240,861, dated May 6, 1941, Serial No. 256,449, February 15, 1939. Application for reissue May 5, 1942, Serial No. 441,880

15 Claims. (Cl. 158—91)

This invention relates to a new and improved oil burner and more particularly to a pot type of burner especially adapted for use in connection with space heating stoves.

Pot type burners in general use comprise pot structures with vertical walls having series of openings therein located at varying distances from the pot bottom. These furnish primary and secondary air for the combustion of the oil which is supplied direct to the bottom of the pot. The oil is vaporized or gasified by heat passing downwardly from the plane which is located directly above the oil. The bottom of the pot is normally in contact with the air which cools it and reduces the efficiency of the generation of the gases and vapors for combustion, causing accumulations of carbon and gums.

In my improved type of burner I provide an oil manifold or oil receiving element or ring located above the pot bottom, the manifold being heated by primary combustion below it and beside it for the generation of the gases and vapors for combustion.

It is an object of the present invention to provide a new and improved pot type burner.

It is a further object to provide a construction of this character in which an oil chamber for generating oil vapors is located between the primary air inlets and secondary air inlets.

A further object is to provide a pot type burner in which the fuel for the pilot flame is introduced at a lower level than the fuel for the high fire stage.

It is also an object to provide a burner in which the oil vapors are generated by combustion laterally and below the oil chamber or manifold.

It is an additional object to provide a construction in which a starting flame may be located adjacent and below the oil manifold or oil receiving element or ring, said flame burning continuously as a pilot flame if desired.

It is a further object to provide means independent of the normal flow for quickly supplying oil for starting the burner.

Other and further objects will appear as the description proceeds.

I have shown certain preferred embodiments of my invention in the accompanying drawings, in which—

Figure 1:
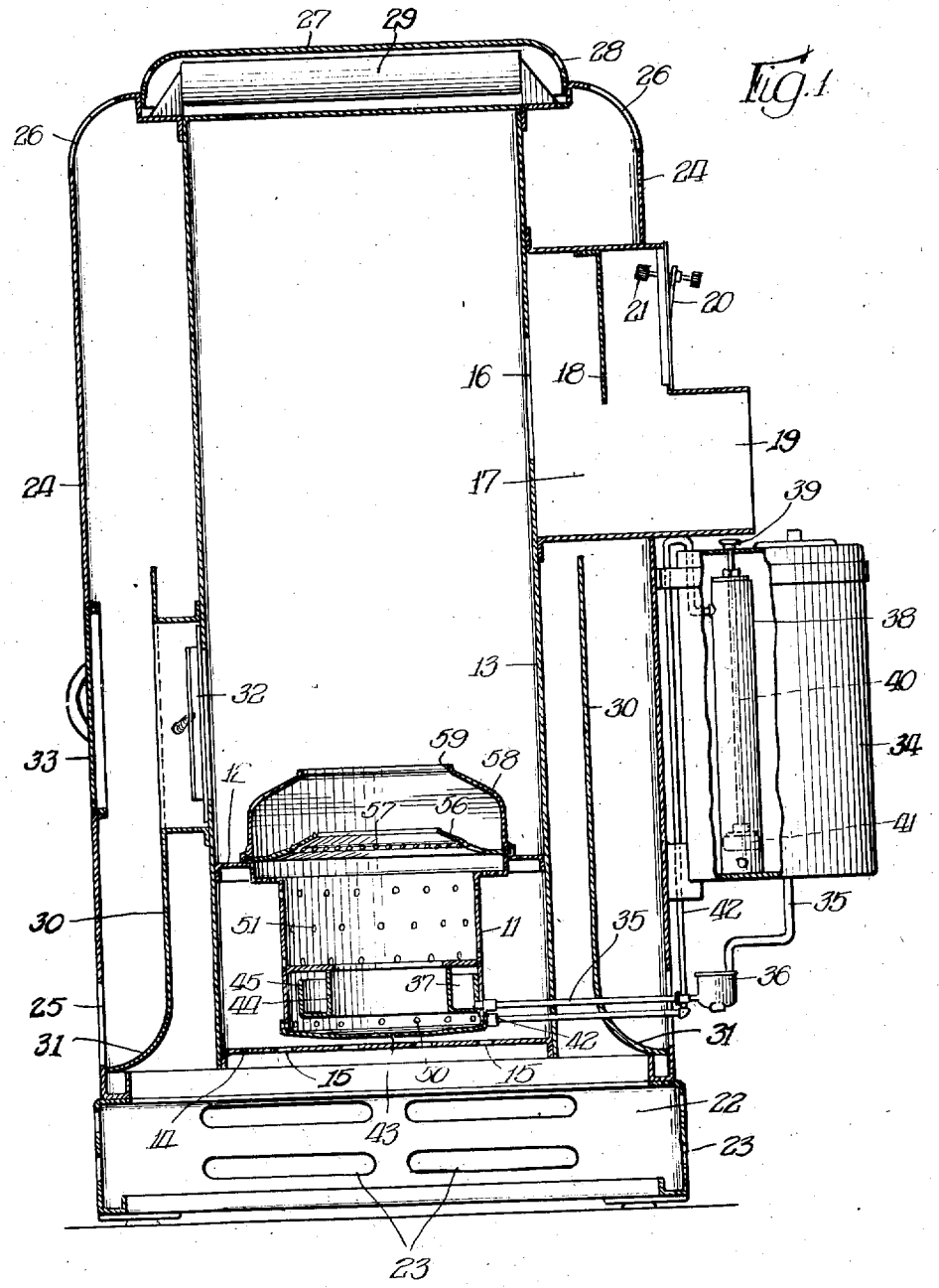
Figure 1 is a vertical section of a space heater incorporating my improved pot type burner.

Referring first to Figure 1, the pot type burner 11 is supported on the partition 12 in the heating drum 13. The bottom 14 of the drum is provided with air inlet openings 15 and the rear wall of the drum is provided with the outlet opening 16 for the products of combustion. This outlet 16 discharges into the draft control chamber 17 which contains the baffle wall 18 and discharges through passage 19 to any suitable flue. The draft control chamber 17 also has the damper 20 fitted with the adjustable weight 21, secured in its rear wall behind the baffle wall 18.

The heating drum 13 is supported on the base 22 having the air inlet openings 23 therein. The shell or housing 24 is supported on the base 22 and encloses the drum 13. The lower portion of the shell 24 has the air inlet openings 25 formed therein and its upper portion is provided with the air outlet openings 26. The shell is fitted with a separate top or cover 27 which is imperforate with the exception of narrow slots 28 along its downturned edge. These slots serve for the discharge of humidified hot air which has passed over water in the pan 29.

The intermediate division wall 30 is located between the shell 24 and the drum 13 and extends from the base of the drum upwardly about half of its height. The lower portion 31 of this wall is turned outwardly to meet the lower portion of the shell so that air passes from the base openings 23 up between the drum 13 and wall 30 while additional air from the lower shell openings 25 passes up between the shell 24 and wall 30. The air mixes above the wall 30 and discharges from the lateral openings 26 and 28 at the top of the heater.

The drum 13 is provided with a door 32 opposite a door 33 on the shell 24. These doors are used to light the burner or to inspect or clean it.

The fuel supply tank 34 is mounted at the rear of the heater and has the oil feed pipe 35, controlled by valve 36, discharging into the fuel ring 37 in the burner. The tank 34 contains the lift pump 38 having the knob 39 connected to rod 40 for actuating the plunger 41 to force oil into the oil pipe 42. This oil pipe 42 discharges into the burner 11 adjacent the bottom 43 and is used to place oil in the burner for igniting the burner.

Figure 2:
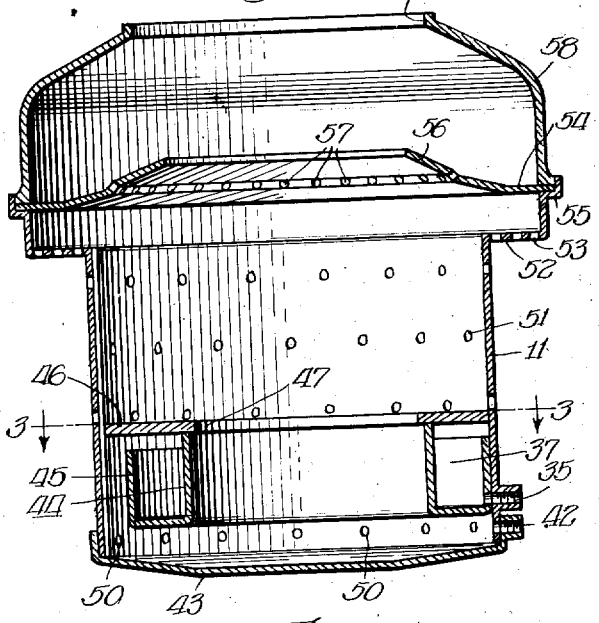
Figure 2 is a vertical section of the burner on an enlarged scale.
Figure 3:
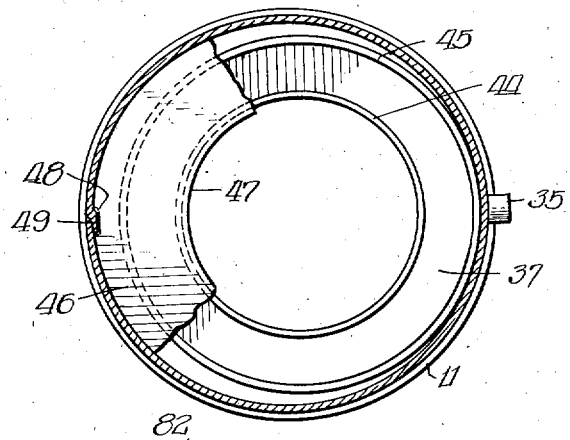
Figure 3 is a cross-section taken on line 3—3 of Figure 2.

The burner construction is shown more in detail in Figures 2 and 3. The oil manifold 37 is a ring of lesser diameter than the interior of the pot and is located eccentrically therein, engaging the pot wall at the point where pipe 35 passes through the wall. The ring 37 may be brazed, welded or otherwise secured in place. The ring 37 is shown as generally U-shaped in cross-section with an inner leg or wall 44 which extends upwardly above the outer wall 45. A cover ring 46 may rest on the wall 44 and has an eccentrically located circular opening 47 in registration with the opening in the ring. As shown, the opening 47 may be made slightly smaller than the opening in the ring, this being solely for the purpose of insuring, with commercial tolerances of manufacture, that the cover ring effectively covers the channel in the oil ring 37. Due to the eccentric location of the opening 47 it is essential that the cover 46 be turned circumferentially to the correct position when it is inserted and to insure this the cover is provided with the notch 48 coating with the inwardly projecting seam 49 on the pot wall. The outer edge of the cover 46 is formed to make a relatively close fit with the inner face of the pot wall.

Figure 6:
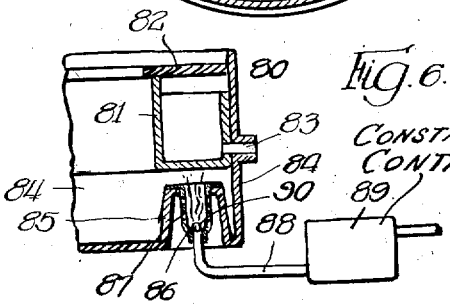
Figure 6 is a fragmentary cross-section showing a pilot light construction.

The lower portion of the pot wall, below the oil manifold 37, is provided with a series of openings 50 which serve for the introduction of primary air for combustion. The upper cylindrical portion of the pot has formed therein the series of openings 51 which serve for the introduction of primary or secondary air for combustion. The outwardly extending wall portion 52 of the pot has the additional perforations 53 which serve for the admission of secondary air. It will be understood that at the pilot stage, as when the structure of Fig. 6 is employed, the apertures 50 serve as the source of primary air, while the apertures 51 may provide secondary air for the pilot stage. However, at the high fire stage the apertures 51, or some of them, may be employed to provide primary air for a mixture which is completed by secondary air flowing in through the upper apertures, for example through the apertures 53. It will be understood in general that the lower apertures in all of the forms of the pot herein shown supply primary air for all stages of combustion, while, as the level of combustion is raised, some of the intermediate apertures in the various alternative pots shown may provide primary air for a mixture which is burned upon receiving secondary air through apertures located at the higher levels of the pot.

The baffle wall 54 is seated on the ledge 55 and is provided with the inner upwardly flaring portion 56. This portion has the inwardly and downwardly directed perforations 57 extending through it. It is to be noted that these perforations 57 do not communicate with the outer air but merely with the air and gases within the cover portion 58 of the burner. This cover rests on the edge of the member 54 on the ledge 55 and is provided with the central opening 59 from which the products of combustion pass into the drum 13.

Figure 4:
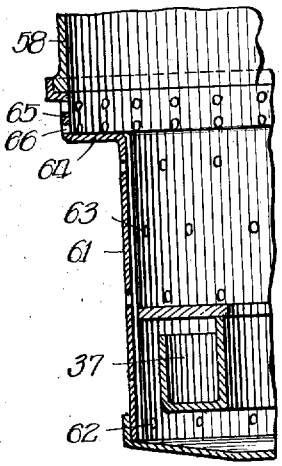
Figure 4 is a fragmentary section illustrating a modified form of construction.

A modified form of construction is shown in Figure 4. Here the pot 61 is provided with the primary air openings 62 and the secondary air openings 63. The horizontal portion 64 is imperforate but the vertical portion 65 has the additional secondary air openings 66. Therefore this upper portion of the secondary air is directed horizontally inwardly in this form of construction instead of being directed upwardly as in the construction of Figure 1.

Figure 5:
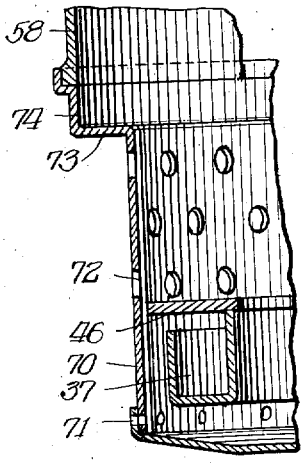
Figure 5 is a view similar to Figure 4 showing a further modification.

A further modification is shown in Figure 5 in which the pot 70 is provided with the usual primary air openings 71. The upper portion has the relatively larger secondary air openings 72 and, in view of the greater area of these openings, no additional secondary air openings are provided in the wall areas 73 and 74. It will be noted that no baffle ring 54 is shown in Figures 4 and 5. Such a ring may be used or it may be omitted in some cases with all types of pot construction shown.

In Figure 6 I have shown a construction provided with a pilot light which may burn continuously with a small flame to maintain the portion of the generating well adjacent the main oil inlet at a generating temperature. In the drawing the pot 80 is provided with the generating ring 81 having the cover 82 and the main oil feed pipe 83. The pot 80 has the usual primary air openings formed therein. The pot bottom is provided with the upwardly extending portion 85 formed in the bottom immediately below that portion of the ring 81 adjacent the connection of the oil inlet line 83 thereto. The pilot burner housing 86 is fitted in this portion 85, the housing having the air inlet opening 87 formed therein. The oil feed pipe 88 is connected to the housing 86 and this pipe is connected to the device 89 which may be of any usual construction for maintaining a constant level of oil at the wick 90 of the pilot burner. The oil will be fed by capillary attraction through the wick.

In the use of my improved burner as shown in Figures 1 and 2, in order to start it in operation a small quantity of oil is delivered to the bottom 43 of the pot by pulling up on the knob 39 of the pump 38. This pump lifts the oil and it then passes by gravity through pipe 42 to the pot bottom 43. At the same time the valve 36 is opened to any desired degree, depending on the amount of heat, and therefore the size of flame, desired. The valve 36 then permits a regulated quantity of oil to flow through pipe 35 into the ring 37 which serves as an oil manifold. The stove doors are opened and a flame is applied to the small pool of oil in the bottom of the burner. As this oil burns it heats the bottom wall and the inner vertical wall of the oil manifold 37, thus vaporizing the oil therein. This oil vapor passes over the outer wall 45 of the manifold and meets primary air which enters through the perforations 50. Partial combustion takes place, the vapors being ignited by the flame upon the starting pool of oil on the bottom of the pot. This primary combustion continues the heating of the manifold after the starting oil has been consumed.

When the form of construction of Figure 6 is used, the burner is started by lighting the pilot light which heats the generating ring sufficiently to generate gaseous fuel for starting purposes. The flame of the pilot light also ignites the main flame. The pilot light uses only a small quantity of fuel and may be left on at all times when heat is likely to be required. The main burner will then be automatically put in operation merely by turning on the main oil supply to any desired degree. This main supply may be manually controlled or may be thermostatically controlled by any of the usual devices available for that purpose.

As the oil is vaporized, additional oil is progressively fed into the manifold through the pipe 35. The partially burned oil vapors which are highly heated by the partial combustion, rise above the top 46 of the manifold through opening 47 and there meet the secondary air entering through the perforations 51. If the air coming through perforations 51 is not adequate to complete combustion on high settings of the fuel valve 36, the additional air which enters through perforations 53 will serve to burn any remaining vapors. In that case the lower perforations 51 are acting as primary inlets at the higher settings of the fuel valve.

The ring or baffle 54 serves to control the flame and maintain it located centrally of the pot. The openings 57 in this ring do not admit additional air but permit a recirculation of heated vapors which pass above the ring and this construction has been found to aid in the maintenance of a uniform flame and heating effect.

In the form of construction of Figure 4, the method of operation is the same, the only difference being that the upper portion of the secondary air is directed horizontally inwardly rather than vertically, as is the case with the form of construction of Figure 2. In the form of construction shown in Figure 5, the secondary air is introduced in larger quantities at a lower level.

An important feature of the generating well construction as shown is that the well has no direct contact with the cooler air about the exterior of the burner, as is the case with pot types of burner where the liquid fuel is vaporized upon the bottom of the burner itself. The present construction, therefore, maintains generating temperature on very low oil setting, since loss of heat at this point is minimized.

Another feature of the oil manifold is that the inner wall of the manifold serves to define a relatively small combustion space which serves for properly burning the oil when it is supplied in small quantities at low settings of the valve 36. On increased oil settings complete combustion requires varying amounts of secondary air which is supplied in the upper cylindrical portion of the pot and the height of the flame will depend upon the quantity of oil fed into the burner. The method of providing oil for starting the burner permits the burner virtually to be lighted instantly when desired. In usual types of burners where this oil must be fed in past the control valve, it is found necessary to wait an appreciable period before the flow furnishes an adequate pool of oil for starting purposes.

I have found that directing the upper portion of the secondary air vertically through the openings 53 in the form of construction shown in Figure 2, affords very effective combustion where this air is required upon high settings of the oil feed valve. I have found, however, that this upper secondary air may be directed horizontally as shown in Figure 4 and an efficient combustion can be obtained. While the baffle 54 has been found to give a somewhat better fire pattern on medium settings of the oil supply valve, nevertheless the other features of the design are such that adequate combustion can be secured without the use of this baffle.

A further feature of the type of generating manifold shown is that the oil being vaporized is shielded from any direct contact with the flames, such as takes place in the ordinary type of burner where the oil is vaporized upon the bottom of the pot. This shielding from the flame results in elimination of gum accumulations which take place in a burner of the conventional type. The cover 46 of the manifold is readily removed, if desired, for inspection or cleaning of the manifold, although it has proven in practice that even with heavy oils the gasification is such as to leave substantially no residue in the manifold.

While I have shown certain preferred embodiments of my invention, these are to be understood as illustrative only, as the construction may be varied to meet differing conditions and requirements and I contemplate such modifications as come within the spirit and scope of the appended claims.

I claim:

1. In a pot type burner, a pot, the pot wall having primary air openings adjacent the bottom, a ring shaped generator located in the pot above the primary openings, the outer wall of the ring having its major portion spaced from the pot wall, a cover for the ring spaced from the upper edge of the outer wall of the ring, the pot wall having secondary air openings therein above the ring, and means for supplying oil to the ring.

2. In a pot type burner, a pot, the pot wall having primary air openings adjacent the bottom, a ring shaped generator located in the pot above the primary openings, the outer wall of the ring having its major portion spaced from the pot wall, a ring shaped cover for the ring spaced from the upper edge of the outer wall of the ring and closely fitting the inner wall of the ring, the pot wall having secondary air openings therein above the ring, and means for supplying oil to the ring.

3. In a pot type burner, a pot, the pot wall having primary air openings adjacent the bottom, a ring shaped generator located in the pot above the primary openings, the outer wall of the ring having its major portion spaced from the pot wall, a ring shaped cover for the ring spaced from the upper edge of the outer wall of the ring and closely fitting the inner wall of the ring, the cover having an inner opening of approximately the same size as the central opening in the ring, the pot wall having secondary air openings therein above the ring, and means for supplying oil to the ring.

4. In a pot type burner, a pot having a lower cylindrical wall portion with primary air openings formed therein adjacent the bottom, the wall having secondary air openings therein at a higher level, an oil vaporizing chamber located within the pot intermediate the primary and secondary air openings, an inwardly directed ring shaped baffle wall above the secondary openings, and an upwardly and inwardly extending upper pot portion above the baffle wall.

5. In a pot type burner, a pot having a lower cylindrical wall portion with primary air openings formed therein adjacent the bottom, the wall having secondary air openings therein at a higher level, a vapor generating chamber located within the pot intermediate the primary and secondary air openings, an inwardly directed ring shaped baffle wall above the secondary openings, perforations in said baffle wall, and an upwardly and inwardly extending imperforate upper pot portion above the baffle wall.

6. In a pot type burner, a pot having a lower cylindrical wall portion with primary air openings formed therein adjacent the bottom, the wall having secondary air openings therein at a higher level, an oil vaporizing chamber located within the pot intermediate the primary and secondary air openings, said chamber opening toward the cylindrical wall, an outwardly extending wall upon the upper portion of the pot, said wall having upwardly directed secondary air openings therein, and an upwardly and inwardly extending pot top section with a central opening therein.

7. In a pot type burner, a pot having a lower cylindrical wall portion with primary air openings formed therein adjacent the bottom, the wall having secondary air openings therein at a higher level, an oil vaporizing chamber located within the pot intermediate the primary and secondary air openings, said chamber opening toward the cylindrical wall, an outwardly offset wall section upon said pot above the secondary air openings, additional secondary air openings in said offset wall section, and an upwardly and inwardly extending pot top section above the offset wall section, said top section having a central opening therein.

8. In a pot type burner, a pot having a lower cylindrical wall portion with primary air openings formed therein adjacent the bottom, the wall having secondary air openings therein at a higher level, an oil vaporizing chamber located within the pot intermediate the primary and secondary air openings, said chamber opening toward the cylindrical wall, an outwardly offset wall section upon said pot above the secondary air openings, additional secondary air openings in said offset wall section, a ring shaped baffle wall extending inwardly above said offset wall section, and an imperforate upwardly and inwardly extending pot top section above the baffle wall, said top section having a central opening therein.

9. In a pot type burner, a burner pot, said pot having a circumferential side wall having a plurality of air inlet apertures located at various levels in the said wall, said pot having an open top and a closed bottom, a flame ring having a central flame aperture located adjacent the top of the pot, means for delivering a liquid fuel directly to the bottom of the pot, a liquid fuel vaporizing element located within the pot and intermediate the top and bottom thereof, and additional means for delivering a liquid fuel thereto, said element having closed bottom and side walls and an open top, said open top being in direct communication with the interior of the pot, said vaporizing element being in the form of an annulus located within the pot.

10. In a pot type burner, a burner pot, said pot having a circumferential side wall having a plurality of air inlet apertures located at various levels in the said wall, said pot having an open top and a closed bottom, a flame ring having a central flame aperture located adjacent the top of the pot, means for delivering a liquid fuel directly to the bottom of the pot, a liquid fuel vaporizing element located within the pot and intermediate the top and bottom thereof, and additional means for delivering a liquid fuel thereto, said element having closed bottom and side walls and an open top, said open top being in direct communication with the interior of the pot, said vaporizing element being in the form of an annulus located within the pot, the outer edge of the annulus being spaced inwardly from the opposed wall of the pot.

11. In a pot type burner, a pot having an open top and a closed bottom and a circumferential side wall in which are located at various levels a plurality of air inlet apertures, an open topped fuel vaporizing element located within the pot, at a level above the lowest and below the highest of said air inlet apertures in the pot wall, and entirely surrounded by said circumferential side wall, means for delivering liquid fuel to the vaporizing element and means for delivering an additional supply of liquid fuel to the interior of the pot at a level below said vaporizing element.

12. In a pot type burner, a pot having an open top and a closed bottom and a circumferential side wall in which are located at various levels a plurality of air inlet apertures, an open topped fuel vaporizing element located within the pot, at a level above the lowest and below the highest of said air inlet apertures in the pot wall, and entirely surrounded by said circumferential side wall, means for delivering liquid fuel to the vaporizing element and means for delivering an additional supply of liquid fuel to the interior of the pot at a level below said vaporizing element, said fuel vaporizing element being in the form of a ring located within said pot.

13. In a pot type burner, a pot having an open top and a closed bottom and a circumferential side wall in which are located at various levels a plurality of air inlet apertures, an open topped fuel vaporizing element located within the pot, at a level above the lowest and below the highest of said air inlet apertures in the pot wall, and entirely surrounded by said circumferential side wall, means for delivering liquid fuel to the vaporizing element and means for delivering an additional supply of liquid fuel to the interior of the pot at a level below said vaporizing element, said fuel vaporizing element being in the form of a ring located within said pot, the outer edge of said vaporizing element being spaced inwardly from the side wall of the pot.

14. In a pot type burner, a pot having an open top and a closed bottom and a circumferential side wall in which primary air inlet apertures are located at a plurality of levels, an annular vaporizing member located entirely within said pot in the space defined by said side wall, means for delivering a liquid fuel to said vaporizing member, additional means for separately delivering a liquid fuel to the bottom of the pot, at a level lower than that of the annular vaporizing member, the bottom of the pot being deepest at its central portion and being adapted to serve as a vaporizing element, and a flame ring for the top of the pot, said flame ring having a central aperture axially aligned with the center of the closed bottom of the pot.

15. In a pot type burner, a pot having an open top and a closed bottom and a circumferential side wall in which primary air inlet apertures are located at a plurality of levels, an annular vaporizing member located entirely within said pot, in the space defined by said side wall, means for delivering a liquid fuel to said vaporizing member, and additional means for separately delivering a liquid fuel to the bottom of the pot, at a level lower than that of the annular vaporizing member, the bottom of the pot being deepest at its central portion and being adapted to serve as a vaporizing element.

ROLLAND C. SABINS.